Sept. 23, 1958
W. STELZER
2,853,056
BOOSTER BRAKE MECHANISM
Filed July 9, 1956
2 Sheets-Sheet 1
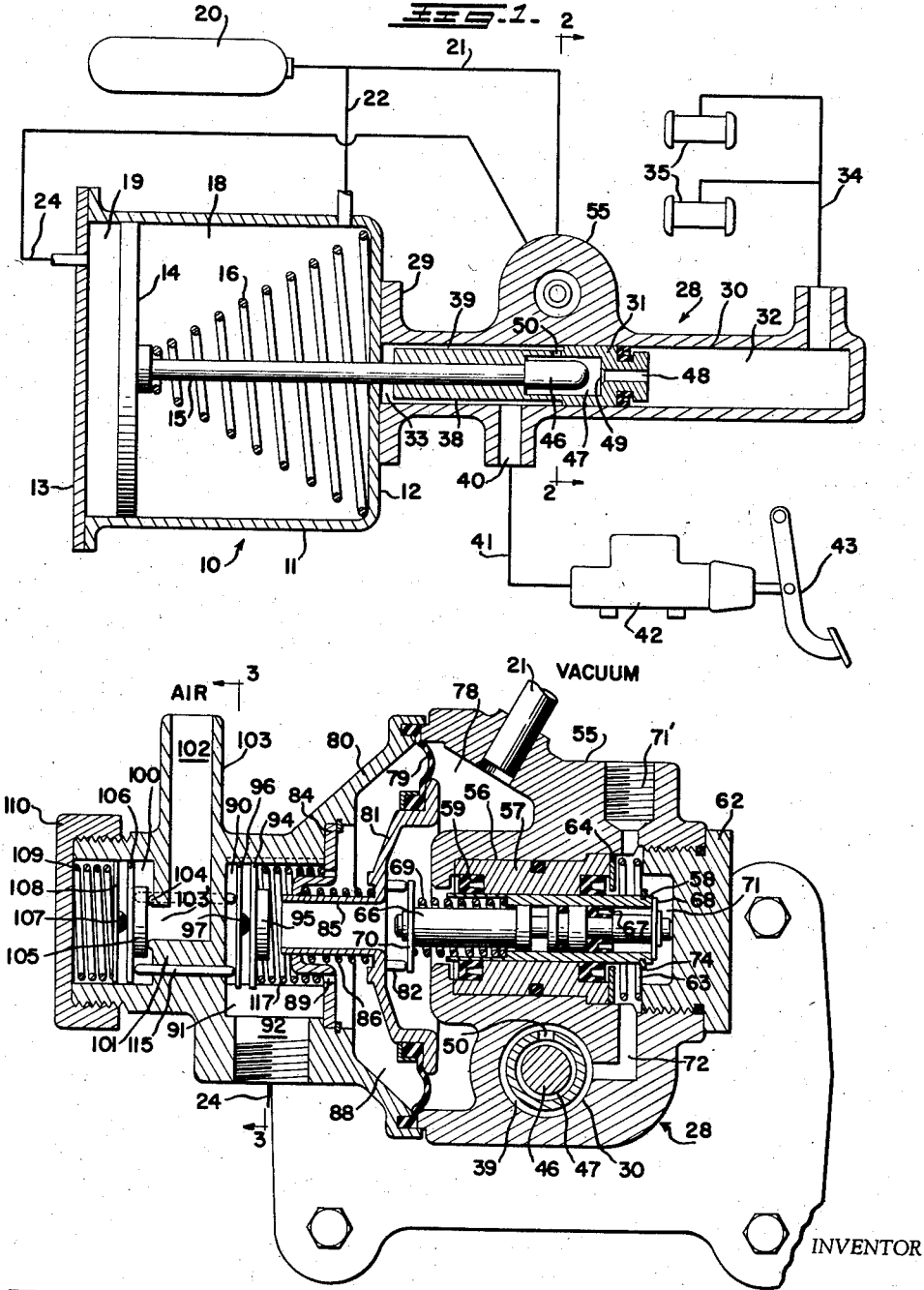
INVENTOR
WILLIAM STELZER
BY John V. Phillips
ATTORNEY

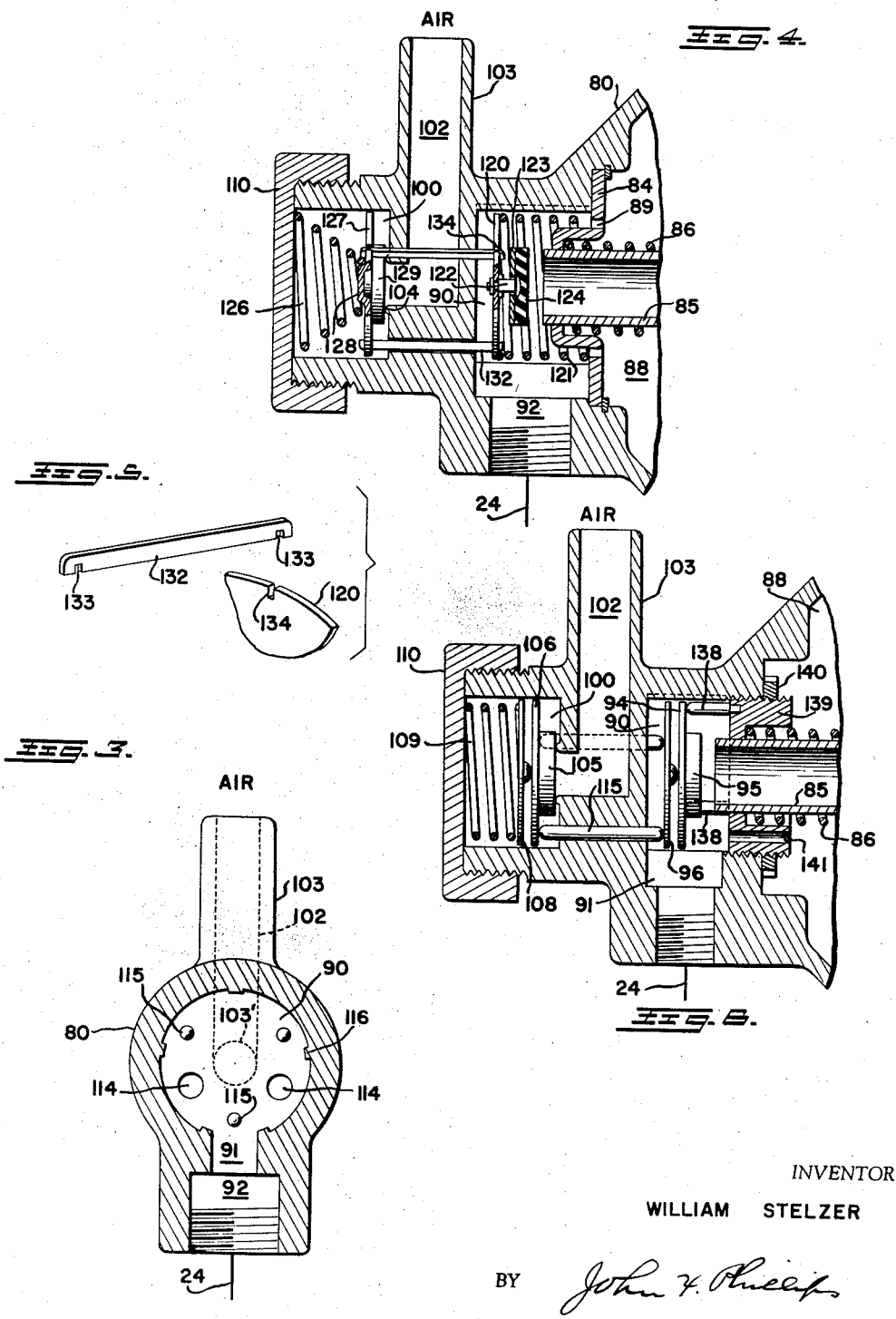

United States Patent Office 2,853,056
Patented Sept. 23, 1958

2,853,056

BOOSTER BRAKE MECHANISM

William Stelzer, Bloomfield Hills, Mich., assignor to Kelsey-Hayes Company, a corporation of Delaware Application July 9, 1956, Serial No. 596,757

10 Claims. (Cl. 121—46.5)

This invention relates to a booster brake mechanism, and more particularly to such an apparatus having a novel type of control valve mechanism for the booster motor.

An important object of the invention is to provide a novel mechanism of the type referred to wherein the booster motor for the system is controlled by a valve mechanism wherein the valve elements, reaction means, etc. are arranged coaxial with each other to simplify the construction and its assembly.

A further object is to provide such a mechanism which is particularly adapted for use with a motor of the vacuum suspended type and wherein the air valve which is adapted to open to admit air to one end of the booster motor is actuated in a novel manner to be moved away from its seat, thus admitting air into one end of the motor without the disadvantage of differential pressures tending to hold the air valve on its seat.

A further object is to provide such a mechanism wherein a pair of axially spaced chambers are separated by an apertured wall through which an air duct extends and terminates in a valve seat opening into one of such chambers, and wherein an air valve arranged in the latter chamber is movable with the air pressure away from its seat, and to utilize the other of such chambers as a control chamber communicating with one end of the booster motor.

A further object is to provide a mechanism of the character just referred to wherein force is imparted to the air valve to unseat it against its biasing spring by means of circumferentially spaced force transmitting elements arranged in a circle surrounding the axis of the air valve seat, thus providing for a balanced and direct axial thrust against the air valve to unseat it when the apparatus is operated.

Other objects and advantages of the invention will become apparent during the course of the following description.

In the drawings I have shown several embodiments of the invention. In this showing:

Figure 1 is a diagrammatic view showing the booster system as a whole, the motor and associated elements being shown in diagrammatic section;

Figure 2 is an enlarged sectional view through the valve mechanism taken substantially on line 2—2 of Figure 1;

Figure 3 is a detail section on line 3—3 of Figure 2;

Figure 4 is a fragmentary sectional view similar to Figure 2 showing a modified type of valve mechanism;

Figure 5 is a detail perspective view of one of the valve actuating pins shown in Figure 4; and Figure 6 is a view similar to Figure 4 showing a further modified type of valve mechanism.

Referring to Figure 1, the numeral 10 designates a booster motor as a whole comprising a cylinder 11 shown as having an integral head 12 at one end and having its other end closed by a head 13. A piston 14 is mounted to reciprocate in the cylinder 11 and is connected to one end of a piston rod 15. The piston 14 is biased to its normal off position by a return spring 16.

The motor illustrated is of the vacuum suspended type and under normal conditions, therefore, as described below, the two motor chambers 18 and 19, on opposite sides of the piston 14, are connected to a source of vacuum. Such source preferably is the intake manifold 20 of the motor vehicle to which is connected one end of a duct 21, and a branch duct 22 is connected between the duct 21 and the motor chamber 18. The chamber 19 is connected to a control duct 24, and this duct in turn is controlled by the valve mechanism described below.

A body 28 is secured at one end 29 to the cylinder head 12 coaxially with the motor and defines an internal cylinder 30 in which is slidable a pressure generating piston 31. The piston 31 divides the cylinder 30 to provide high and low pressure hydraulic chambers 32 and 33 respectively, and the chamber 32 communicates through suitable hydraulic lines 34 with the wheel cylinders of the vehicle, two of which have been illustrated and indicated by the numeral 35.

The left-hand end of the piston 31 is of reduced diameter as at 38 to form with the cylinder 30 an annular space 39 forming a part of the low pressure chamber 32. The annular space 39 communicates at all times through a radial duct 40 with a hydraulic line 41 leading to a conventional master cylinder 42 operable by a pedal 43.

The piston rod 15 is slidable in the left-hand end of the piston 31 as viewed in Figure 1 and is provided at its end with a head 46 mounted in a chamber 47 in the piston 31. This chamber normally communicates with the high pressure chamber 32 through an axial duct 48 terminating at its inner end in a valve seat 49 engaged by the adjacent end of the head 46 when the latter is actuated by the piston 14, to close the duct 48. It will be apparent that the valve seat 49 is normally open, and the chamber 47 is in constant communication through a port 50 with the annular space 39 for the flow of fluid through chamber 47 and duct 48 into the high pressure chamber 32 upon initial operation of the brake pedal 43, as explained below.

A valve body 55 is formed integral with the body 28 as shown in Figures 1 and 2 and has its axis arranged above and extending perpendicular to the axis of the cylinder 30. The body 55 is provided with an axial recess 56 in which is arranged a plug 57 forming a cylinder slidably receiving a sleeve 58 suitably sealed as at 59. The outer end of the recess 56 is closed by a threaded cap 62. A compression spring 63 seats at one end against the cap 62 and at its other end against a washer 64, thus maintaining the plug 57 in position in the recess 56.

A plunger 66 is slidable in the sleeve 58 and is sealed with respect thereto in any suitable manner, for example as at 67. The right-hand end of the plunger 66 as viewed in Figure 2 is provided with a washer 68 fixed thereon and normally engaged with the adjacent end of the sleeve 58, and the adjacent end of the plunger 66 engages the cap 62 to limit movement of the plunger 66 and sleeve 58 toward the right in Figure 2. The other end of the plunger 66 is provided with a washer 70, and a compression spring 69 is arranged between this washer and the sleeve 58 to tend to maintain the opposite end of this sleeve in engagement with the washer 68. Within the cap 62 is formed a hydraulic chamber 71 communicating through a passage 72 with the space 39. Accordingly, hydraulic fluid displaced into such space from the master cylinder 42 will flow into the chamber 71 and the pressure of such fluid is utilized for operating the sleeve 58 and plunger 66. The chamber 71 is provided with an opening 71' in which may be mounted a conventional bleed plug.

The right-hand end of the sleeve 58 as viewed in Figure 2 is provided with a snap ring 74. This ring is normally spaced from the washer 64 and is engageable with such washer under operating conditions to be described, to limit movement of the sleeve 58 toward the left as viewed in Figure 2.

The valve body 55 and the main body 28 are formed to provide an annular chamber 78 (Figure 2) communicating with the vacuum duct 21. The peripheral portion of a reaction diaphragm 79 is fixed against the adjacent end of chamber 78 by a cap structure 80. The inner periphery of the diaphragm 79 is fixed to an annular plate 81 having circumferentially spaced pins 82 projecting to the right as shown in Figure 2 and engaging the washer 70.

A combined guide and spring seat 84 is arranged in the cap structure 80 and slidably surrounds a tubular member 85 formed integral with the plate 81 and projecting to the left thereof as viewed in Figure 2. A compression spring 86 surrounds the tubular member 85 and engages at opposite ends against the member 84 and plate 81 to urge the latter toward the right in Figure 2. The two springs 69 and 86 serve to maintain engagement of the pins 82 with the washer 70.

The space to the left of the diaphragm 79 in Figure 2 forms a chamber 88 communicating through openings 89 in the member 84 with another chamber 90 communicating as at 91 (Figures 2 and 3) with a port 92 to which the control duct 24 is connected. The chamber 90, because of its communication through ports 89 with the chamber 88, forms in effect with the latter chamber a control chamber the pressures in which will determine the pressure in the motor chamber 19.

A disk 94 is arranged in the chamber 90 and has fixed to one side thereof a resilient poppet valve 95 engageable with the adjacent end of the tubular member 85 which functions as a valve seat, under conditions to be described. An operating disk 96 is also arranged in the chamber 90 and is provided with an axial preferably stamped hemispherical boss 97 engageable with the disk 94.

The cap structure 80 is provided with another chamber 100, coaxial with the other chambers described, and divided from the chamber 90 by a wall 101. This wall is provided with a duct 102 the radially outer end of which is formed as a nipple 103 adapted for connection with a suitable air cleaner (not shown) whereby atmospheric pressure is always present in the duct 102. The inner end of this duct is turned to the left as viewed in Figure 2, as at 103', to form an air opening coaxial with the chambers 90 and 100 and coaxial also with the tubular member 85 and valve 95 and associated elements. The opening 103' terminates in a valve seat 104 engageable by a normally seated resilient valve 105 carried by a disk 106 arranged in the chamber 100. This disk engages a preferably stamped axial boss 107 formed on another disk 108 backed up by a return spring 109 engageable against a cap 110 which forms a closure for the chamber 100.

The wall 101 (Figure 3) is provided with openings 114 affording communication between the chambers 90 and 100 so that pressures are always balanced in these chambers. The chambers 90 and 100, therefore, are in effect a single chamber, and such chamber is the control chamber for the motor to determine pressures in the variable pressure chamber 19, as described below. Motion is transmitted between the disks 96 and 106 by circumferentially spaced parallel pins 115 loosely slidable through the wall 101 and arranged in a circle coaxial with the disks 96 and 106. It will become apparent that the disks 94, 96, 106 and 108 are slidable in their respective chambers, and to facilitate such sliding movement, these chambers may be provided with radially inwardly extending guide ribs 116 as shown in Figure 3.

The spring 109 normally maintains the valve 105 seated and is stronger than a spring 117 interposed between the disk 94 and member 84. The springs 109 and 117 act in opposition to each other as will be apparent, and while the spring 117 is normally overcome by the spring 109, the spring 117 must be strong enough, when the brakes are released, to overcome atmospheric pressure in the chamber 90, which pressure is present upon the full energization of the motor 10 as described below when the valve mechanism has been actuated and the tubular member 85 is in engagement with the valve 95. The operation with respect to these elements will be further described below.

In the form of the invention just described, the actuating pins 115 have round ends, as clearly shown in Figure 2, and act as pusher elements between the disks 96 and 106. In the form of the invention shown in Figure 4, the corresponding elements provide a positive connection between disks corresponding to those described. The elements in Figure 4 corresponding to those in Figure 2 have been indicated by the same reference numerals. In Figure 4, the disk 96 previously described is replaced by a disk 120 engaged by a spring 121 corresponding to the spring 117. The disk 120 has rigidly fixed thereto a stem 122 projecting through a relatively small disk 123 and having a head bonded in a resilient valve element 124 corresponding to the valve 95. The play between the stem 122 and the opening in the disk 123 permits rocking movement of the valve 124 relative to the stem 122 for the proper seating of the valve.

Instead of the spring 109, the chamber 100 is provided therein with a convolute spring 126 the smaller end of which engages a disk 127, surrounding and being maintained in position by a central boss 128 on such disk. This disk carries an air valve 129, and the smaller end of the spring 126 permits the disk 127 to rock more easily for the effective seating of the valve 129.

Instead of the pins 115 of circular cross section with rounded ends, the form of the device shown in Figure 4 utilizes pins 132 of flat strip section notched in one edge adjacent each end thereof as at 133. Such ends of the pins 132 are movable into radial slots 134 formed in the disks 120 and 127 with the notches 133 overlying the disks at the inner extremities of the notches 134 to provide a positive motion transmitting connection between the disks 120 and 127.

The form of the invention shown in Figure 6 is substantially identical with the form shown in Figure 2 except for the use of the spring 117 which unseats the valve 95 when the parts move back toward their normal positions. In place of the spring 117, a plurality of stationary pins 138 is arranged in the chamber 90 to the right of and engaging the disk 94. These pins are carried by a threaded plug 139, substituted for the member 84 of Figure 2 and locked in position by a jam nut 140. As in the case of the member 84, the plug 139 is apertured as at 141 to maintain free communication between the chambers 88 and 90.

*Operation*

The parts of the apparatus shown in Figures 1 and 2 are normally positioned as shown in such figures. Assuming that the brakes are to be applied, the operator will depress the pedal 43 to displace fluid into the space 39, thence through port 50 into space 47. The head 46 being spaced from the seat 49, hydraulic fluid will flow through duct 48 into the high pressure chamber 32 and thence into the wheel cylinders. Upon initial engagement of the brake shoes with the drums, pressure will be built up in the entire system between the master cylinder 42 and the wheel cylinders. Since the chamber 71 (Figure 2) communicates with the space 39, the pressure build-up referred to will act against the plunger 66 and sleeve 58. These elements will move as a unit to the left (Figure 2) during initial operation of the system. The washer 70 imparts movement to the plate 81 to move the tubular member 85 into engagement with the valve 95. Previous to such valve engagement, it will be obvious that the constant vacuum in the chamber 78 will have been communicated through the tubular member 85, chamber 90 and duct 24 to the motor chamber 19. As soon as the valve 95 is seated in the manner described, the chamber 90 will be disconnected from the vacuum source. Further slight movement of the tubular member 85 to the left in Figure 2 will effect similar movement of the valve 95, and such movement will be transmitted through the disk 96 and pins 115 to the disk 106 to unseat the valve 105.

Under normal conditions, the vacuum maintained in the chamber 90 will have been duplicated in the chamber 100 through the play around the pins 115 and through the openings 114 (Figure 3). Normally, therefore, air pressure will have been acting against the face of the valve 105 within the seat 104 while vacuum will be present at the opposite side of the valve. The differential pressure thus normally present is overcome by the spring 109. This spring is overcome by movement of the pins 115, and since the differential pressures tend to open the valve 105 rather than to maintain it closed, the valve will move freely from its seat so far as differential pressures are concerned, thus admitting air from the duct 102 into the chamber 100, thence through openings 114 into the chamber 90. From this chamber air flows through duct 24 into the motor chamber 19 to move the piston 14 toward the right in Figure 1. Initial movement of this piston engages the free end of the head 46 with the valve seat 49, thus completely closing communication between the low pressure end of the cylinder 30 and the high pressure end thereof. Thereafter, the power of the motor 10 will be delivered through the piston rod 15 to the plunger 31 to move it toward the right and generate higher pressures in the chamber 32. The foot generated pressures from the master cylinder 42, supplied to the low pressure chamber 33, will act against the adjacent end of the plunger 31 to assist the motor in generating pressures in the chamber 32 and also in providing direct reaction against the pedal 43 after the point is reached at which the head 46 starts to push the plunger 31.

When the parts are in the normal positions shown in Figure 2, vacuum is present on opposite sides of the diaphragm 79 and plate 81 and these elements are pressure-balanced. However, as soon as the valve 95 is engaged by the tubular member 85 and the valve 105 is cracked to admit air into the chamber 90, the increase in pressure in such chamber, duplicated in the chamber 88, will unbalance pressures on opposite sides of the diaphragm 79 and plate 81, thus providing an elastic fluid pressure reaction which greatly improves the "feel" of the brake pedal 43 during the period of operation of the device between initial movement of the pedal 43 and the point at which the head 46 engages the seat 49.

However, the diaphragm 79 and associated elements form no part of the present invention but are disclosed and claimed in the copending application of Jeannot G. Ingres, Serial No. 540,240, filed October 13, 1955, having an assignee common to this application.

Initial movement of the plunger 66 and sleeve 58, moving as a unit, takes place solely against the relatively light spring 86. The building-up of pressure in the chamber 88 (Figure 2) provides progressively increasing resistance against movement of the plunger 66 and the sleeve 58, the latter element transmitting its force to the washer 70 and plate 81 through the spring 69. Therefore, the substantial combined area of the plunger 66 and sleeve 58 exposed to manually generated pressure in the chamber 71 results in overcoming the elastic fluid pressure reactions transmitted against the plunger 66 at relatively low pressures in the chamber 71, but the effective area of the movable parts subject to pressure in the chamber 71 decreases at a slightly later stage.

As the elastic fluid reaction forces oppose movement of the plunger 66 to a progressively increasing extent, the sleeve 58 will be unaffected and shortly after initial motor energization, the sleeve 58 will be moved by hydraulic pressure in the chamber 71 until the ring 74 engages the washer 64. This operation moves the sleeve 58 out of engagement with the washer 68. This renders the elastic fluid reaction more effective in opposing hydraulic pressure in the chamber 71, and the operator will feel a greater resistance to movement of the pedal 43, thus providing for a "soft" initial pedal operation followed by a greater resistance due to elastic fluid reaction and then a still greater resistance due to the direct hydraulic reaction transmitted from the chamber 32 through piston 31 to the space 39 and thus to the master cylinder.

When the brake pedal is released, the spring 109 (Figure 2) will return the air valve 105 to closed position, and such movement of the valve will be transmitted through pins 115 to the disks 96 and 94 until the valve 105 is seated. No further force is transmitted to the valve 95 by the spring 109. The spring 86 will then move the plate 81 to move the tubular member 85 out of engagement with the valve 95. The springs 86 and 117 must be sufficiently strong to overcome differential pressures acting on opposite sides of the valve 95 after the closed position of the valve 105 is reached, there being atmospheric or nearly atmospheric pressure present to the left of the valve 95 in Figure 2 while vacuum is present in the tubular member 85. The spring 117 thus is depended upon to prevent the valve 95 from following the tubular member 85 as the latter moves to its fully off position. The spring 109 of course must be strong enough in the normal positions of the parts to overcome the force of the spring 117 plus the force of the air acting to the right of the valve 105.

The operations of the forms of the invention shown in Figures 4 and 6 are substantially identical with the form previously described. The pins 132 serve as positive connections between the disks 120 and 127. Therefore, when the valve 129 is seated when it returns to normal position, the positive connection between the disks 120 and 127 prevents the former from moving beyond the normal off positions of the parts. Therefore, the spring 121 may be relatively light since it is not depended upon, as is true of the spring 117 in Figure 2, to prevent the valve 124 from following the tubular member 85. The spring 121 need not be used at all but its use is preferred so that it will encircle the adjacent ends of the clips 132 to prevent radially outward movement thereof.

In Figure 6, no spring is employed in the chamber 90 and the pins 115 are employed to transmit positive movement to the valve 105 to move it from its seat. When the parts return to normal position, the pins 138 will engage the disk 94, preferably slightly after engagement of the valve 105 with its seat, to positively prevent the disk 94 and its valve 95 from following the tubular member 85. Thus this member may move to the fully off position to connect the chamber 90 to the vacuum chamber 78 and restore the normal vacuum in the motor chamber 19.

The several forms of the invention illustrated and described embody important features from the standpoint particularly of production and assembly. It is pointed out that in a device of this character it is important to maintain manufacturing costs as low as possible while providing efficient operation, and it is likewise important to simplify assembly operations and minimize assembly time to maintain as low as possible the sales cost of the device. This simplicity is attained in the present construction by the maintenance in axial alinement of all of the parts associated with the valve mechanism, as shown in Figure 2. The plunger 66 is assembled within the sleeve 58 from the left-hand end thereof, whereupon the washer 68 is locked in position and the assembly inserted into the plug 57. This plug is inserted in position, the spring 72 is inserted, followed by the applying of the cap 62. The elements within the chamber 90 are inserted in position followed by the placing of the member 84, whereupon the diaphragm assembly is placed in position relative to the cap structure 80 and secured to the body 55. The pins 115 readily may be inserted from the left-hand end of the device in Figure 2, followed by the easy assembly of the elements including the valve 105.

In connection with the foregoing, attention is invited to the fact that it is highly desirable to seat the air valve in a device of this character against air pressure. If it is necessary to unseat the air valve against air pressure, a lumpy operation results since substantial force is necessary to unseat the air valve and resistance drops suddenly after the valve is unseated and pressures are balanced with respect thereto. The present construction utilizes an arrangement wherein the air valve is seated against air pressure, thus permitting such pressure to smoothly open the valve merely by partially compressing the spring 109, the air pressure smoothly moving the valve 105 from its seat. The simple arrangement of parts is possible because of the use of the pins 115 arranged coaxially around the seat 104 for transmitting movement between the disks 96 and 106.

It will be apparent, therefore, that the coaxial arrangement of parts simplifies and provides economy in manufacture and assembly, and the basic advantages of the device in Figure 2 are present in the forms of the invention shown in Figures 4 and 6. The very distinct advantages in the arrangement and operation of the air valve are secured in the present construction while maintaining direct coaxiality of the parts throughout the valve mechanism.

The valves 95 and 124 may be conveniently described as "low pressure" valves, and the valves 105 and 129 may be described as "high pressure" valves.

It is to be understood that the forms of the invention shown and described are to be taken as preferred examples of the same and that various changes in the shape, size, and arrangement of the parts may be made as do not depart from the spirit of the invention or the scope of the appended claims.

I claim:

1. In a fluid pressure motor comprising a casing and a pressure responsive unit forming with said casing a variable pressure chamber, a valve mechanism for controlling pressures in said chamber, said valve mechanism comprising a control chamber communicating with said variable pressure chamber, a high pressure valve in said control chamber, a low pressure valve coaxial with said high pressure valve and spaced therefrom in said control chamber, a duct connected to a source of relatively high pressure and opening through a valve seat coaxial with said valves and adjacent said high pressure valve, means biasing said high pressure valve to closed position, a tubular member having its interior connected to a source of relatively low pressure and having one end forming a valve seat for said low pressure valve and normally disengaged therefrom, means connected to move said tubular member coaxially of and into engagement with said low pressure valve to disconnect said control chamber from the interior of said tubular member, and a plurality of motion transmitting elements parallel to the axis of said valves and spaced therearound, said elements engaging said valves whereby movement of said tubular member after it engages said low pressure valve will transmit movement to said high pressure valve to move it from its valve seat.

2. In a fluid pressure motor comprising a casing and a pressure responsive unit forming with said casing a variable pressure chamber, a valve mechanism for controlling pressures in said chamber, said valve mechanism comprising a control chamber communicating with said variable pressure chamber, a high pressure valve in said control chamber, a low pressure valve coaxial with said high pressure valve and spaced therefrom in said control chamber, a duct connected to a source of relatively high pressure and opening through a valve seat coaxial with said valves and adjacent said high pressure valve, means biasing said high pressure valve to closed position, a tubular member having its interior connected to a source of relatively low pressure and having one end forming a valve seat for said low pressure valve and normally disengaged therefrom, means connected to move said tubular member coaxially of and into engagement with said low pressure valve to disconnect said control chamber from the interior of said tubular member, a wall interposed between said valves and in which said duct is formed, and motion transmitting means slidable through said wall and having mechanical engagement at opposite ends with said valves whereby movement of said tubular member after it engages said low pressure valve will transmit movement to said high pressure valve to move it from its seat.

3. In a fluid pressure motor comprising a casing and a pressure responsive unit forming with said casing a variable pressure chamber, a valve mechanism for controlling pressures in said chamber, said valve mechanism comprising a control chamber communicating with said variable pressure chamber, a high pressure valve in said control chamber, a low pressure valve coaxial with said high pressure valve and spaced therefrom in said control chamber, a duct connected to a source of relatively high pressure and opening through a valve seat coaxial with said valves and adjacent said high pressure valve, means biasing said high pressure valve to closed position, a tubular member having its interior connected to a source of relatively low pressure and having one end forming a valve seat for said low pressure valve and normally disengaged therefrom, means connected to move said tubular member coaxially of and into engagement with said low pressure valve to disconnect said control chamber from the interior of said tubular member, a wall interposed between said valves and in which said duct is formed, and a plurality of pins slidable through said wall and arranged parallel to the axis of said valves, and spaced circumferentially around such axis, the ends of said pins engaging said valves whereby movement of said tubular member after it engages said low pressure valve will effect movement of said high pressure valve from said seat.

4. In a fluid pressure motor comprising a casing and a pressure responsive unit forming with said casing a variable pressure chamber, a valve mechanism for controlling pressures in said chamber, said valve mechanism comprising a control chamber communicating with said variable pressure chamber, a high pressure valve in said control chamber, a low pressure valve coaxial with said high pressure valve and spaced therefrom in said control chamber, a duct connected to a source of relatively high pressure and opening through a valve seat coaxial with said valves and adjacent said high pressure valve, a first spring biasing said high pressure valve to closed position, a tubular member communicating with a source of relatively low pressure coaxial with said valves at the side of said low pressure valve opposite said high pressure valve and normally disengaged from said low pressure valve to connect said control chamber to said source of low pressure, a second spring biasing said low pressure valve away from said tubular member, means biasing said tubular member away from said low pressure valve, motion transmitting means between and having mechanical connection with said valves, and means for moving said tubular member into engagement with said low pressure valve to close said tubular member to said control chamber, further movement of said tubular member beyond such position transmitting movement through said motion transmitting means to unseat said high pressure valve, said springs opposing each other through said motion transmitting means and said first spring being substantially stronger than said second spring.

5. A mechanism according to claim 4 wherein said motion transmitting means comprises a plurality of pins circumferentially arranged in a circle coaxial with said valves and parallel to the axis of said valves.

6. A mechanism according to claim 4 provided with a wall in said control chamber in which said duct is formed, said motion transmitting means comprising a plurality of pins slidable through said wall.

7. In a fluid pressure motor comprising a casing and a pressure responsive unit forming with said casing a variable pressure chamber, a valve mechanism for controlling pressures in said chamber, said valve mechanism comprising a control chamber communicating with said variable pressure chamber, a high pressure valve in said control chamber, a low pressure valve coaxial with said high pressure valve and spaced therefrom in said control chamber, a duct connected to a source of relatively high pressure and opening through a valve seat coaxial with said valves and adjacent said high pressure valve, a spring biasing said high pressure valve to closed position, an axially movable tubular member coaxial with said valves and arranged at the side of said low pressure valve opposite said high pressure valve, the interior of said tubular member being connected to a source of relatively low pressure, motion transmitting means between said valves, said tubular member having one end forming a valve seat and said tubular member having a normal position with such seat disengaged from said low pressure valve, means for axially moving said tubular member from said normal position to a position engaging said low pressure valve to disconnect the interior of said tubular member from said control chamber, movement of said tubular member beyond such position unseating said high pressure valve, and means for preventing said low pressure valve from following said tubular member back to its normal position when the latter is retracted and said spring seats said high pressure valve, said motion transmitting means comprising a plurality of pins circumferentially spaced around and parallel to the axis of said valves.

8. In a fluid pressure motor comprising a casing and a pressure responsive unit forming with said casing a variable pressure chamber, a valve mechanism for controlling pressures in said chamber, said valve mechanism comprising a control chamber communicating with said variable pressure chamber, a high pressure valve in said control chamber, a low pressure valve coaxial with said high pressure valve and spaced therefrom in said control chamber, a duct connected to a source of relatively high pressure and opening through a valve seat coaxial with said valves and adjacent said high pressure valve, a spring biasing said high pressure valve to closed position, an axially movable tubular member coaxial with said valves and arranged at the side of said low pressure valve opposite said high pressure valve, the interior of said tubular member being connected to a source of relatively low pressure, motion transmitting means between said valves, said tubular member having one end forming a valve seat and said tubular member having a normal position with such seat disengaged from said low pressure valve, means for axially moving said tubular member from said normal position to a position engaging said low pressure valve to disconnect the interior of said tubular member from said control chamber, movement of said tubular member beyond such position unseating said high pressure valve, and means for preventing said low pressure valve from following said tubular member back to its normal position when the latter is retracted and said spring seats said high pressure valve, a wall between said valves and in which said duct is formed, said motion transmitting means comprising circumferentially spaced pins parallel to the axis of said valves and slidable through said wall.

9. In a fluid pressure motor comprising a casing and a pressure responsive unit forming with said casing a variable pressure chamber, a valve mechanism for controlling pressures in said chamber, said valve mechanism comprising a control chamber communicating with said variable pressure chamber, a high pressure valve in said control chamber, a low pressure valve coaxial with said high pressure valve and spaced therefrom in said control chamber, a duct connected to a source of relatively high pressure and opening through a valve seat coaxial with said valves and adjacent said high pressure valve, a spring biasing said high pressure valve to closed position, an axially movable tubular member coaxial with said valves and arranged at the side of said low pressure valve opposite said high pressure valve, the interior of said tubular member being connected to a source of relatively low pressure, motion transmitting means between said valves, said tubular member having one end forming a valve seat and said tubular member having a normal position with such seat disengaged from said low pressure valve, means for axially moving said tubular member from said normal position to a position engaging said low pressure valve to disconnect the interior of said tubular member from said control chamber, movement of said tubular member beyond such position unseating said high pressure valve, and means for preventing said low pressure valve from following said tubular member back to its normal position when the latter is retracted and said spring seats said high pressure valve, said means for preventing said low pressure valve from following said tubular member to its normal position comprising a second spring opposing such movement of said low pressure valve, said first-named spring being stronger than said second spring.

10. In a fluid pressure motor comprising a casing and a pressure responsive unit forming with said casing a variable pressure chamber, a valve mechanism for controlling pressures in said chamber, said valve mechanism comprising a control chamber communicating with said variable pressure chamber, a high pressure valve in said control chamber, a low pressure valve coaxial with said high pressure valve and spaced therefrom in said control chamber, a duct connected to a source of relatively high pressure and opening through a valve seat coaxial with said valves and adjacent said high pressure valve, a spring biasing said high pressure valve to closed position, an axially movable tubular member coaxial with said valves and arranged at the side of said low pressure valve opposite said high pressure valve, the interior of said tubular member being connected to a source of relatively low pressure, motion transmitting means between said valves, said tubular member having one end forming a valve seat and said tubular member having a normal position with such seat disengaged from said low pressure valve, means for axially moving said tubular member from said normal position to a position engaging said low pressure valve to disconnect the interior of said tubular member from said control chamber, movement of said tubular member beyond such position unseating said high pressure valve, and means for preventing said low pressure valve from following said tubular member back to its normal position when the latter is retracted and said spring seats said high pressure valve, a wall between said valves and in which said duct is formed, said motion transmitting means comprising a plurality of circumferentially spaced pins parallel to the axis of said valves and provided in their inner edges with notches engaging said valves to fix said valves against axial movement with respect to each other.

References Cited in the file of this patent

UNITED STATES PATENTS

| | | |
|---|---|---|
| 2,013,665 | Messier | Sept. 10, 1935 |
| 2,393,524 | Fant | Jan. 22, 1946 |
| 2,658,348 | Stelzer | Nov. 10, 1953 |